(12) United States Patent
Osburn et al.

(10) Patent No.: US 9,422,847 B2
(45) Date of Patent: Aug. 23, 2016

(54) SYSTEM AND METHOD OF ISOLATING COMPONENT FAILURES IN AN EXHAUST AFTERTREATMENT SYSTEM

(71) Applicant: Cummins, Inc., Columbus, IN (US)

(72) Inventors: Andrew W. Osburn, Nashville, IN (US); Mark N. Bays, Columbus, IN (US); Krishna Kamasamudram, Columbus, IN (US); Aleksey Yezerets, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 58 days.

(21) Appl. No.: 14/586,156

(22) Filed: Dec. 30, 2014

(65) Prior Publication Data

US 2016/0186629 A1 Jun. 30, 2016

(51) Int. Cl.
*F01N 3/00* (2006.01)
*F01N 3/02* (2006.01)
*F01N 3/10* (2006.01)
*F01N 3/20* (2006.01)
*F01N 3/18* (2006.01)

(52) U.S. Cl.
CPC .. *F01N 3/18* (2013.01); *F01N 3/10* (2013.01); *F01N 3/208* (2013.01); *F01N 3/2066* (2013.01); *Y02T 10/24* (2013.01); *Y02T 10/47* (2013.01)

(58) Field of Classification Search
CPC ............. F01N 3/10; F01N 3/18; F01N 3/208; F01N 3/2066; Y02T 10/24; Y02T 10/47
USPC ..................... 60/286, 295, 297, 299, 301, 311
See application file for complete search history.

(56) References Cited

U.S. PATENT DOCUMENTS

| | | | |
|---|---|---|---|
| 8,091,416 B2 | 1/2012 | Wang et al. | |
| 8,161,808 B2 | 4/2012 | Crawford et al. | |
| 8,201,444 B2 | 6/2012 | Wang et al. | |
| 8,245,567 B2 | 8/2012 | Wang et al. | |
| 8,596,042 B2* | 12/2013 | Parmentier | F01N 3/208 60/275 |
| 2011/0030348 A1* | 2/2011 | Crawford | F01N 3/103 60/277 |
| 2011/0072798 A1* | 3/2011 | Herman | F01N 3/208 60/286 |
| 2011/0146235 A1* | 6/2011 | Hagimoto | F01N 3/2066 60/274 |
| 2013/0014575 A1 | 1/2013 | Levijoki et al. | |
| 2013/0074477 A1 | 3/2013 | Kim et al. | |
| 2013/0263575 A1* | 10/2013 | Sun | F01N 11/00 60/274 |
| 2013/0276428 A1* | 10/2013 | Levijoki | F01N 11/00 60/274 |
| 2014/0331752 A1* | 11/2014 | Hall | F01N 11/00 73/114.75 |

* cited by examiner

*Primary Examiner* — Audrey K Bradley
*Assistant Examiner* — Dapinder Singh
(74) *Attorney, Agent, or Firm* — Foley & Lardner LLP

(57) ABSTRACT

An apparatus includes a dosing module structured to suspend dosing in an exhaust aftertreatment system; a selective catalytic reduction (SCR) inlet NOx module structured to interpret SCR inlet NOx data and an SCR inlet temperature; a SCR outlet NOx module structured to interpret SCR outlet NOx data; and a system diagnostic module structured to determine an efficiency of a SCR system based on the SCR inlet and outlet NOx data over a range of SCR temperatures, wherein the system diagnostic module is further structured to determine a state of at least one of a diesel oxidation catalyst (DOC), a diesel particulate filter (DPF), and the SCR system based on the SCR efficiency at an elevated SCR temperature range and the SCR efficiency at a relatively lower SCR temperature range relative to a high SCR efficiency threshold and a low SCR efficiency threshold.

20 Claims, 7 Drawing Sheets

SYSTEM AND METHOD OF ISOLATING COMPONENT FAILURES IN AN EXHAUST AFTERTREATMENT SYSTEM

TECHNICAL FIELD

The present disclosure relates to diagnostic procedures for exhaust aftertreatment systems. More particularly, the present application relates to a diagnostic procedure for isolating component failures in an exhaust aftertreatment system.

BACKGROUND

Emissions regulations for internal combustion engines have become increasingly more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems are generally designed to reduce emission of particulate matter, nitrogen oxides (NOx), hydrocarbons, and other environmentally harmful pollutants. However, the components that make up the exhaust aftertreatment system can be susceptible to failure and degradation. Because the failure or degradation of components may have adverse consequences on performance and the emission-reduction capability of the exhaust aftertreatment system, the detection and, if possible, correction of failed or degraded components is desirable. In fact, some regulations require on-board diagnostic (OBD) monitoring or testing of many of the components of the exhaust aftertreatment system. When equipped on vehicles, most monitoring and testing of aftertreatment system components are performed during on-road operation of the vehicle (e.g., while the vehicle is being driven on the road). Although such monitoring and testing may be convenient, the efficacy of the monitoring and testing may be limited because the engine cannot be operated outside of a given on-road calibrated operating range. Additionally, because on-road operating demands typically have priority over diagnostic and performance recovery procedures, the order, timing, and control of such procedures may be less than ideal. As a result, the detection and correction of various failure modes in the exhaust aftertreatment system may be limited via OBD monitoring and testing.

SUMMARY

One embodiment relates to a system. The system includes an engine, an exhaust aftertreatment system, and a controller coupled to the engine and the exhaust aftertreatment system. The exhaust aftertreatment system is in exhaust gas receiving communication with the engine, wherein the exhaust aftertreatment system includes a selective catalytic reduction (SCR) system, a diesel oxidation catalyst (DOC), and a catalyzed diesel particulate filter (DPF). The controller is structured to: interpret a first set of NOx data, the first set of NOx data including selective catalytic reduction (SCR) inlet NOx data and SCR outlet NOx data; determine that the exhaust aftertreatment system is purged of a reductant deposit based on the first set of NOx data; interpret a second set of NOx data corresponding to an elevated SCR inlet temperature range, the second set of NOx data including SCR inlet NOx data and SCR outlet NOx data; determine a first SCR efficiency based on the second set of NOx data; reduce a temperature of the exhaust gas flowing through the exhaust aftertreatment system; interpret a third set of NOx data corresponding to a relatively lower SCR inlet temperature range, the third set of NOx data including SCR inlet NOx data and SCR outlet NOx data; determine a second SCR efficiency based on the third set of NOx data; and determine a state of at least one of the DOC, DPF, and SCR system based on the first and second SCR efficiencies relative to a low SCR efficiency threshold and a high SCR efficiency threshold. By analyzing the SCR efficiency over a range of SCR inlet temperatures, the controller is able to isolate component failures such that numerous other troubleshooting procedures may be avoided. In turn, a service technician may diagnose the exhaust aftertreatment system relatively quicker thereby saving a customer time and money.

Another embodiment relates to an apparatus. The apparatus includes a dosing module structured to suspend dosing in an exhaust aftertreatment system; a selective catalytic reduction (SCR) inlet NOx module structured to interpret SCR inlet NOx data from a SCR inlet NOx sensor and interpret an SCR inlet temperature; a SCR outlet NOx module structured to interpret SCR outlet NOx data from a SCR outlet NOx sensor; and a system diagnostic module structured to determine an efficiency of a SCR system based on the SCR inlet and outlet NOx data over a range of SCR inlet temperatures, wherein the system diagnostic module is further structured to determine a state of at least one of a diesel oxidation catalyst (DOC), a diesel particulate filter (DPF), and the SCR system based on the SCR efficiency at an elevated SCR inlet temperature range and the SCR efficiency at a relatively lower SCR inlet temperature range relative to a high SCR efficiency threshold and a low SCR efficiency threshold.

Still another embodiment relates to a method. The method includes purging an exhaust aftertreatment system of a reductant deposit; interpreting a first set of NOx data, the first set of NOx data including selective catalytic reduction (SCR) inlet NOx data and SCR outlet NOx data; determining that the exhaust aftertreatment system is purged of the reductant deposit based on the first set of NOx data; interpreting a second set of NOx data corresponding to an elevated SCR inlet temperature range, the second set of NOx data including SCR inlet NOx data and SCR outlet NOx data; determining a first SCR efficiency based on the second set of NOx data; reducing a temperature of the exhaust gas flowing through the exhaust aftertreatment system; interpreting a third set of NOx data corresponding to a relatively lower SCR inlet temperature range, the third set of NOx data including SCR inlet NOx data and SCR outlet NOx data; determining a second SCR efficiency based on the third set of NOx data; and determining a state of at least one of a diesel oxidation catalyst (DOC), a diesel particulate filter (DPF), and a SCR system based on the first and second SCR efficiencies relative to a low SCR efficiency threshold and a high SCR efficiency threshold.

These and other features, together with the organization and manner of operation thereof, will become apparent from the following detailed description when taken in conjunction with the accompanying drawings.

DETAILED DESCRIPTION OF VARIOUS EMBODIMENTS

Figure 1:
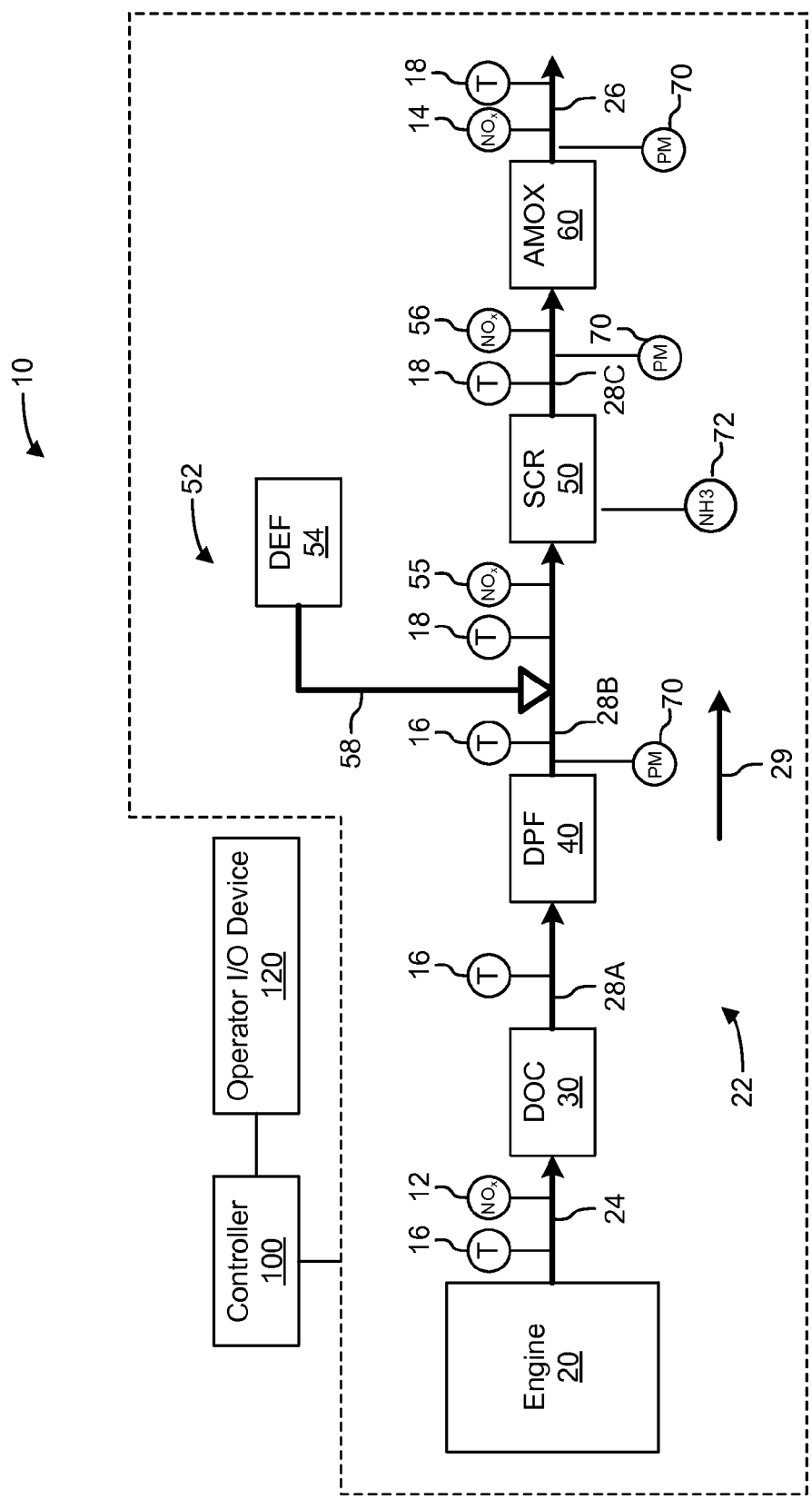
FIG. 1 is a schematic diagram of an exhaust aftertreatment system with a controller, according to an example embodiment.

Referring to the figures generally, the various embodiments disclosed herein relate to systems and methods of identifying and isolating potential component failures in exhaust aftertreatment systems. According to the present disclosure, a controller performs an intrusive diagnostic procedure that manipulates the engine out exhaust gas temperature while simultaneously receiving nitrous oxide (NOx) data entering and leaving a selective catalytic reduction (SCR) system of an exhaust aftertreatment system. Based on the NOx data, the controller determines an efficiency of the SCR system over a range of SCR inlet temperatures. Utilizing the SCR efficiency as a function of SCR inlet temperature data, the controller determines a state (e.g., degraded or healthy) of at least one of a diesel oxidation catalyst (DOC), a diesel particulate filter (DPF) system, and the SCR system. For example, the controller determines that only the DOC is in a healthy state based on a low SCR efficiency at a high SCR inlet temperature range and a marginal SCR efficiency at a low range of SCR inlet temperatures. In another example, for low SCR efficiencies over a high SCR inlet temperature range, the controller determines that only the SCR system is in a degraded state. In other embodiments, other characteristic temperatures may be considered during the diagnostic procedure. For example, the characteristic temperature may include a temperature, either measured or estimated, in the middle of the SCR system. The diagnostic of the SCR system may also be based on a combination of temperatures across the SCR system (e.g., inlet, middle, outlet, etc.). As described more fully herein, the controller uses this two-dimensional diagnostic feature (i.e., SCR efficiency as a function of SCR inlet temperature) to diagnose the state of the DOC, DPF, and/or SCR in an exhaust aftertreatment system. By identifying specific component failures in the exhaust aftertreatment, the controller alleviates the need for multiple diagnostic tests which may save time and money during the troubleshooting process and minimize the use of resources (e.g., controller bandwidth and memory in performing multiple diagnostics). In other words, technically and advantageously, the controller of the present disclosure is structured to provide a relatively more efficient diagnostic process by diagnosing a multitude of exhaust aftertreatment components in one process, which reduces the need for many diagnostic procedures. This simplifies the diagnostic process and may allow service technicians to service more vehicles throughout a workday while users are able to minimize downtime (i.e., non-operational time) of their engine-exhaust aftertreatment system. These and other features of the present disclosure are described more fully herein.

As used herein, the term "intrusive" (in regard to performing one or more diagnostic tests) is used to refer to an active diagnostic test. In other words, the intrusive method, system, and apparatus of the present disclosure describe a diagnostic test or protocol that is forced to run on the engine and exhaust aftertreatment system (i.e., causes the engine to operate at a certain speed, etc.). As a result, the active or intrusive diagnostic test is often run in a service bay or test center environment. In comparison, a passive diagnostic test may be performed while the engine and exhaust aftertreatment system are operational. For example, if embodied in a vehicle, the passive test may be performed while the operator is driving the vehicle. If an error is detected, a fault code or indicator lamp may be actuated to alert the operator of maintenance/service that may be required (e.g., an on-board diagnostic procedure). According to the present disclosure, an intrusive method, system, and apparatus is utilized with an engine and exhaust aftertreatment system to manipulate the temperature of exhaust gas and therefore, SCR inlet temperature, to identify and isolate specific component failures within the exhaust aftertreatment system. Due to being an intrusive diagnostic, the method, system, and apparatus of the present disclosure may cause the overriding of various set engine operating points. For example, many engine operating points are set to be in compliance with one or more vehicular laws (e.g., emissions). By overriding one or more of these operating points, the engine may be forced into non-compliance with one or more vehicular laws. However, this intrusive test, procedure, and/or protocol allows for the effective isolation of component failures within the exhaust aftertreatment system.

As also used herein, the term "degraded" in regard to a state of the DOC, DPF and/or SCR refers to that component operating outside one or more passing/acceptable standards. The passing/acceptable standards may be defined in the test diagnostic and/or via one or more inputs through an input/output device, such as the input/output device 120 of FIG. 1. The passing/acceptable standard(s) refer to operating parameters of the component that indicate whether that component is operational and therefore, healthy (i.e., does not need to be further serviced, replaced, troubleshot, and/or checked). For example, a healthy SCR may correspond with an SCR efficiency at or above forty percent over all engine operating conditions; a healthy DOC may correspond with a five percent reduction in engine out NOx over all engine operating conditions; etc.

Referring now to FIG. 1, an engine-exhaust aftertreatment system with a controller is shown, according to an example embodiment. The engine system 10 includes an internal combustion engine 20 and an exhaust aftertreatment system 22 in exhaust gas-receiving communication with the engine 20. According to one embodiment, the engine 20 is structured as a compression-ignition internal combustion engine that utilizes diesel fuel. However, in various alternate embodiments, the engine 20 may be structured as any other type of engine (e.g., spark-ignition) that utilizes any type of fuel (e.g., gasoline). Within the internal combustion engine 20, air from the atmosphere is combined with fuel, and combusted, to power the engine. Combustion of the fuel and air in the compression chambers of the engine 20 produces exhaust gas that is operatively vented to an exhaust manifold and to the exhaust aftertreatment system 22.

In the example depicted, the exhaust aftertreatment system 22 includes a diesel particular filter (DPF) 40, a diesel oxidation catalyst (DOC) 30, a selective catalytic reduction (SCR) system 52 with a SCR catalyst 50, and an ammonia oxidation (AMOx) catalyst 60. The SCR system 52 further includes a reductant delivery system that has a diesel exhaust fluid (DEF) source 54 that supplies DEF to a DEF doser 56 via a DEF line 58.

In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOx catalyst 60 and exits the AMOx catalyst into outlet piping 26 before the exhaust gas is expelled from the exhaust aftertreatment system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOx catalyst 60. However, in alternative embodiments, other arrangements of the components of the exhaust aftertreatment system 22 are also possible The DOC 30 may have any of various flow-through designs. Generally, the DOC 30 is structured to oxidize at least some particulate matter, e.g., the soluble organic fraction of soot, in the exhaust and reduce unburned hydrocarbons and CO in the exhaust to less environmentally harmful compounds. For example, the DOC 30 may be structured to decrease the hydrocarbon and CO concentrations in the exhaust to meet the requisite emissions standards for those components of the exhaust gas. An indirect consequence of the oxidation capabilities of the DOC 30 is the ability of the DOC to oxidize NO into $NO_2$. In this manner, the level of $NO_2$ exiting the DOC 30 is equal to the $NO_2$ in the exhaust gas generated by the engine 20 plus the $NO_2$ converted from NO by the DOC.

In addition to treating the hydrocarbon and CO concentrations in the exhaust gas, the DOC 30 may also be used in the controlled regeneration of the DPF 40, SCR catalyst 50, and AMOx catalyst 60. This can be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, SCR catalyst 50, and/or the AMOx catalyst 60. The amount of unburned HC added to the exhaust gas is selected to achieve the desired temperature increase or target controlled regeneration temperature.

The DPF 40 may be any of various flow-through or wall-flow designs, and is structured to decrease particulate matter concentrations, e.g., soot and ash, in the exhaust gas to meet or substantially meet requisite emission standards. The DPF 40 captures particulate matter and other constituents, and thus may need to be periodically regenerated to burn off the captured constituents. According to one embodiment, the DPF 40 may be catalyzed. In turn, the DPF 40 may be configured to oxidize the particulate matter (e.g., soot) entrapped by the filter to form $NO_2$ independent of the DOC 30. The catalyst may be structured as any type of catalyst included with a DPF, such as platinum.

As discussed above, the SCR system 52 may include a reductant delivery system with a reductant (e.g., DEF) source 54, a pump and a delivery mechanism or doser 56. The reductant source 54 can be a container or tank capable of retaining a reductant, such as, for example, ammonia ($NH_3$), DEF (e.g., urea), or diesel oil. The reductant source 54 is in reductant supplying communication with the pump, which is configured to pump reductant from the reductant source to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50. As described herein, the controller 100 is structured to control the timing and amount of the reductant delivered to the exhaust gas. In some embodiments, the reductant may either be ammonia or DEF, which decomposes to produce ammonia. The ammonia reacts with NOx in the presence of the SCR catalyst 50 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$.

The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst.

The AMOx catalyst 60 may be any of various flow-through catalysts configured to react with ammonia to produce mainly nitrogen. The AMOx catalyst 60 is structured to remove ammonia that has slipped through or exited the SCR catalyst 50 without reacting with NOx in the exhaust. In certain instances, the exhaust aftertreatment system 22 may be operable with or without an AMOx catalyst. Further, although the AMOx catalyst 60 is shown as a separate unit from the SCR catalyst 50 in FIG. 1, in some implementations, the AMOx catalyst may be integrated with the SCR catalyst, e.g., the AMOx catalyst and the SCR catalyst can be located within the same housing. According to the present disclosure, the SCR catalyst and AMOx catalyst are positioned serially, with the SCR catalyst preceding the AMOx catalyst. In various other embodiments, the AMOx catalyst is not included in the exhaust aftertreatment system 22. In these embodiments, the NOx sensor 14 may be excluded from the exhaust aftertreatment system 22 as well.

Various sensors, such as $NH_3$ sensor 72, NOx sensors 12, 14, 55, 57 and temperature sensors 16, 18, may be strategically disposed throughout the exhaust aftertreatment system 22 and may be in communication with the controller 100 to monitor operating conditions of the engine system 10. As shown, more than one NOx sensor may be positioned upstream and downstream of the SCR catalyst 50. In this configuration, the NOx sensor 12 measures the engine out NOx while the NOx sensor 55 measures the SCR catalyst 50 inlet NOx amount, which is referred to as the SCR inlet NOx sensor 55 herein. Due to the DOC 30/DPF 40 potentially oxidizing some portion of the engine out NOx (e.g., NO, etc.), the proportions of engine out NOx amounts (e.g., NO, $NO_2$, etc.) may not be equal to the proportions of SCR catalyst 50 inlet NOx amount. For example, NO may be oxidized to $NO_2$ in the DOC 30/DPF 40 such that the relative proportions of NO, $NO_2$, etc. may not be equal to the original proportions from the engine, but the total concentration of NOx remains the same. Accordingly, this configuration accounts for this potential discrepancy. The NOx amount leaving the SCR catalyst 50 may be measured by the NOx sensor 57 and/or the NOx sensor 14. In some embodiments, there may be only NOx sensor 57 or NOx sensor 14 depending on whether the configuration of the exhaust aftertreatment system 22 includes the AMOx catalyst 60. The NOx sensor 57 is positioned downstream of the SCR catalyst 50 and is structured to detect the concentration of NOx in the exhaust gas downstream of the SCR catalyst 50 (e.g., exiting the SCR catalyst), which is referred to as the SCR outlet NOx sensor 57 herein.

The temperature sensors 16 are associated with the DOC 30 and DPF 40, and thus can be defined as the DOC/DPF temperature sensors 16. The DOC/DPF temperature sensors are strategically positioned to detect the temperature of exhaust gas flowing into the DOC 30, out of the DOC and into the DPF 40, and out of the DPF before being dosed with DEF by the doser 56. The temperature sensors 18 are associated with the SCR catalyst 50 and AMOx catalyst 60 and thus can be defined as SCR/AMOx temperature sensors 18. The SCR/AMOx temperature sensors 18 are strategically positioned to detect the temperature of exhaust gas flowing into the SCR catalyst 50, out of the SCR catalyst 50, into the AMOx catalyst 60, and out of the AMOx catalyst 60. By way of example, temperature sensors may be strategically positioned before and after any component within the exhaust aftertreatment system 22 such that the temperature of the exhaust gas flowing into and out of any component may be detected.

As shown in FIG. 1, a particulate matter (PM) sensor 70 is positioned downstream of the SCR 50. According to one embodiment, the PM sensor 70 is positioned in any position downstream of the DPF 40. Accordingly, other locations of the PM sensor 70 are also depicted in FIG. 1: after the DPF 40, after the AMOx catalyst 60, after the SCR catalyst 50, etc. In some embodiments, more than one PM sensor 70, as shown in FIG. 1, may also be included in the system. The PM sensor 70 is structured to monitor particulate matter flowing through the exhaust aftertreatment system 22. By monitoring the particulate matter, the PM sensor 70 monitors the functionality of the DPF 40 and/or other components of the exhaust aftertreatment system 22.

Although the exhaust aftertreatment system 22 shown includes one of a DOC 30, DPF 40, SCR catalyst 50, and AMOx catalyst 60 positioned in specific locations relative to each other along the exhaust flow path, in other embodiments, the exhaust aftertreatment system may include more than one of any of the various catalysts positioned in any of various positions relative to each other along the exhaust flow path as desired. Further, although the DOC 30 and AMOx catalyst 60 are non-selective catalysts, in some embodiments, the DOC and AMOX catalyst can be selective catalysts.

FIG. 1 is also shown to include an operator input/output (I/O) device 120. The operator I/O device 120 is communicably coupled to the controller 100, such that information may be exchanged between the controller 100 and the I/O device 120, wherein the information may relate to one or more components of FIG. 1 or determinations (described below) of the controller 100. The operator I/O device 120 enables an operator of the engine system 10 to communicate with the controller 100 and one or more components of the engine system 10 of FIG. 1. For example, the operator input/output device 120 may include, but is not limited to, an interactive display, a touchscreen device, one or more buttons and switches, voice command receivers, etc. In various alternate embodiments, the controller 100 and components described herein may be implemented with non-vehicular applications (e.g., a power generator). Accordingly, the I/O device may be specific to those applications. For example, in those instances, the I/O device may include a laptop computer, a tablet computer, a desktop computer, a phone, a watch, a personal digital assistant, etc. Via the I/O device 120, the controller 100 may provide a fault or service notification based on the determined state of the SCR catalysts 50 and the SCR inlet and outlet NOx sensors 55 and 57 (in some embodiments, when the AMOx catalyst is included, the NOx sensor 14).

The controller 100 is structured to control the operation of the engine system 10 and associated sub-systems, such as the internal combustion engine 20 and the exhaust gas aftertreatment system 22. According to one embodiment, the components of FIG. 1 are embodied in a vehicle. In various alternate embodiments, as described above, the controller 100 may be used with any engine-exhaust aftertreatment system. The vehicle may include an on-road or an off-road vehicle including, but not limited to, line-haul trucks, mid-range trucks (e.g., pick-up trucks), tanks, airplanes, and any other type of vehicle that utilizes an exhaust aftertreatment system. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 100 is communicably coupled to the systems and components of FIG. 1, the controller 100 is structured to receive data from one or more of the components shown in FIG. 1. For example, the data may include NOx data (e.g., an incoming NOx amount from SCR inlet NOx sensor 55 and an outgoing NOx amount from SCR outlet NOx sensor 57), dosing data (e.g., timing and amount of dosing delivered from doser 56), and vehicle operating data (e.g., engine speed, vehicle speed, engine temperature, etc.) received via one or more sensors. As another example, the data may include an input from operator input/output device 120. The structure and function of the controller 100 is further described in regard to FIG. 2.

Figure 2:
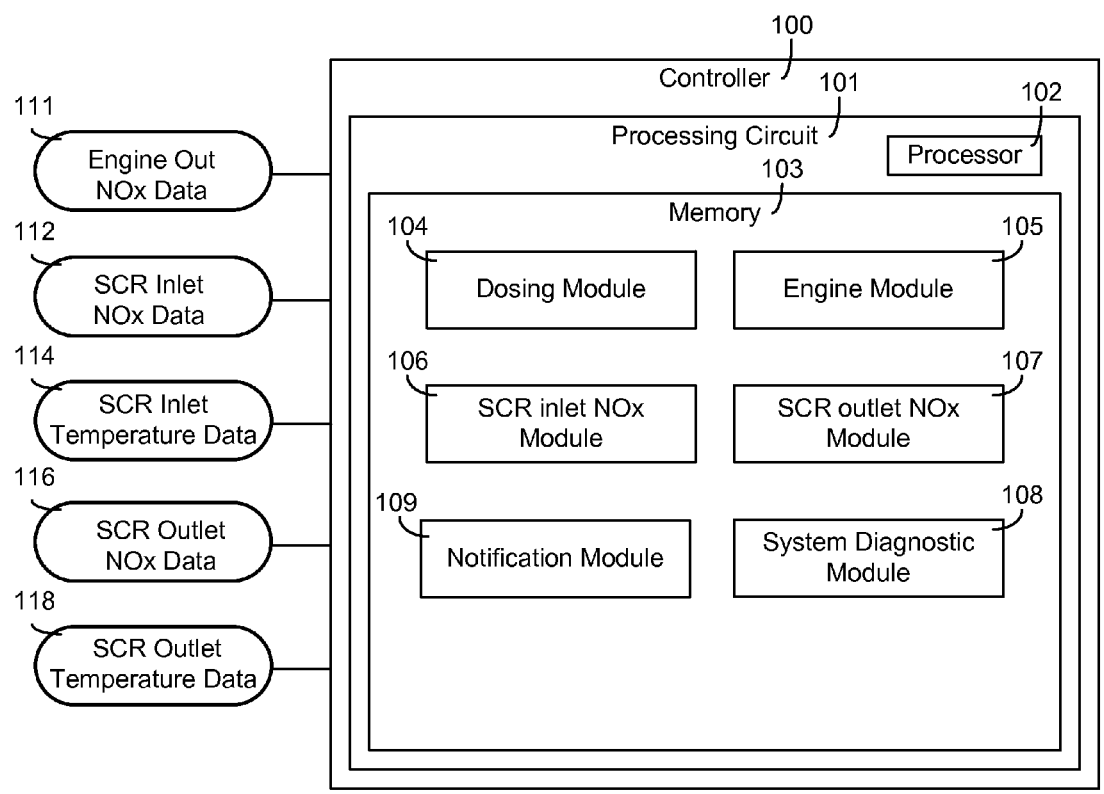
FIG. 2 is a schematic diagram of the controller used with the system of FIG. 1, according to an example embodiment.

As such, referring now to FIG. 2, an example structure for the controller 100 is shown according to one embodiment. As shown, the controller 100 includes a processing circuit 101 including a processor 102 and a memory 103. The processor 102 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 103 (e.g., RAM, ROM, Flash Memory, hard disk storage, etc.) may store data and/or computer code for facilitating the various processes described herein. Thus, the one or more memory devices 103 may be communicably connected to the processor 102 and provide computer code or instructions to the processor 102 for executing the processes described in regard to the controller 100 herein. Moreover, the one or more memory devices 103 may be or include tangible, non-transient volatile memory or non-volatile memory. Accordingly, the one or more memory devices 103 may include database components, object code components, script components, or any other type of information structure for supporting the various activities and information structures described herein.

The memory 103 is shown to include various modules for completing the activities described herein. More particularly, the memory 103 includes modules structured to diagnose and isolate component failures within the exhaust aftertreatment system 22. While various modules with particular functionality are shown in FIG. 2, it should be understood that the controller 100 and memory 103 may include any number of modules for completing the functions described herein. For example, the activities of multiple modules may be combined as a single module, additional modules with additional functionality may be included, etc. Further, it should be understood that the controller 100 may further control other vehicle activity beyond the scope of the present disclosure.

Certain operations of the controller 100 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
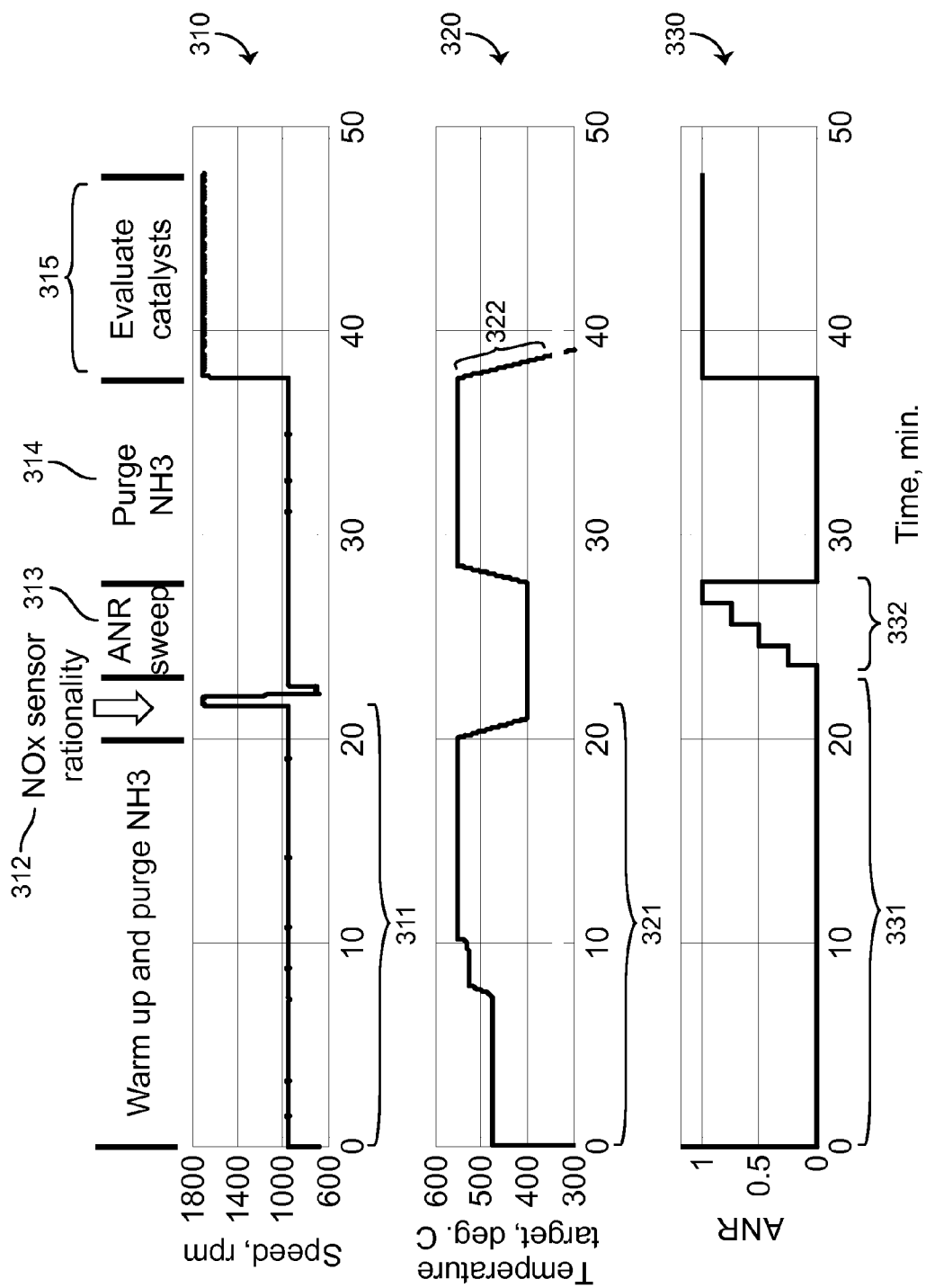
FIG. 3 are graphs of a selective catalytic reduction (SCR) system diagnostic test, according to an example embodiment.

As shown, the controller 100 includes a dosing module 104, an engine module 105, a SCR inlet NOx module 106, a SCR outlet NOx module 107, a system diagnostic module 108, and a notification module 109. FIG. 3 depicts an example diagnostic test protocol according to the present disclosure. To aid explanation of the present disclosure, FIG. 3 is explained in regard to FIG. 2 and FIG. 1. The dosing module 104 is structured to provide a dosing command to a reductant doser, such as doser 56. The dosing command may include at least one of a command to suspend reductant dosing injection into the exhaust flow and/or a command to increase, decrease, or maintain a reductant dosing injection rate/amount into the exhaust gas flow. According to another embodiment, the dosing command may further include a stoichiometric dosing command. The stoichiometric dosing command refers to the exact amount of reductant needed to reduce all of the NOx amount present in the exhaust gas. In operation, the dosing module 104 is structured to receive NOx data from NOx sensors 12 and 55 (e.g., the amount of NOx in the exhaust gas), such that the dosing module 104 determines the stoichiometric reductant amount for the current amount of NOx in the exhaust gas. At stoichiometric conditions, all of the reductant is consumed by the exhaust gas (i.e., no extra reductant to therefore accumulate in the SCR system or slip into the SCR exhaust gas stream, etc.). As described more fully herein, to isolate a component failure in the exhaust aftertreatment system, the dosing module 104 is structured to first suspend reductant dosing and then resume dosing at stoichiometric conditions. The suspension of reductant dosing corresponds with portions 311, 321, and 331 of graphs 310, 320, and 330 of FIG. 3.

The engine module 105 is structured to provide an engine operation command to the engine 20. The engine operation command is structured to adjust one or more operating parameters of the engine 20. The engine operation command may include, but is not limited to, an ignition timing adjustment, an engine speed adjustment, an exhaust gas recirculation (EGR) flow amount adjustment, fuel injection timing adjustment, fuel injection pressure adjustment, a fuel injection amount adjustment, an air flow amount, a number of fuel injection pulses, a fuel flow amount, and an engine torque output, among other alternatives. The engine operation commands may be provided individually or with other commands. The extent to which any of the foregoing engine operation commands may be used and in what combination may vary based on engine design and/or engine application.

Each of the foregoing engine operation commands may be implemented to increase the temperature of the aftertreatment system 22. According to one embodiment, the engine operation commands are structured to purge or substantially purge residual reductant deposits in the SCR system 52. According to the example depicted in FIG. 3, the engine module 105 is structured to provide an engine operation command to the engine 20 to run the engine for a predetermined amount of time (e.g., twenty minutes, which corresponds with portion 311) at a predetermined engine speed (e.g., approximately 1000 revolutions-per-minute (RPM)). In FIG. 3, the engine module 105 provides a relatively constant engine speed command. In various other embodiments, the commanded speed and duration may vary based on the application. As seen in graph 320, the combination of the suspension of dosing and operating the engine at a preset speed for a predetermined amount of time causes the temperature (portion 321) of the exhaust gas to increase (e.g., a temperature controlled mode, etc.). The increase in exhaust gas temperature burns off residual reductant amounts in the exhaust aftertreatment system.

The SCR inlet NOx module 106 is structured to receive and store measured exhaust NOx amount data entering the SCR system (e.g., SCR system 52), such as inlet NOx data 112. Thus, the SCR inlet NOx module 106 may be communicably coupled to the SCR inlet NOx sensor 55. The SCR inlet NOx module 106 is also structured to receive and store SCR inlet temperature data 114. The SCR inlet temperature data 114 corresponds with the temperature of the exhaust gas entering the SCR system 52. Accordingly, the SCR inlet NOx module 106 may also be communicably coupled to the SCR inlet temperature sensor 18. The SCR outlet NOx module 107 is structured to receive and store the measured exhaust NOx data, such as outlet NOx data 116, exiting the SCR system 52. Thus, the SCR outlet module 107 may be communicably coupled to the SCR outlet NOx sensor 57. The SCR outlet NOx module 107 may also be structured to receive and store SCR outlet temperature data 118. The SCR outlet temperature data 118 corresponds with the temperature of the exhaust gas leaving the SCR system 52. Accordingly, the SCR outlet NOx module 107 may also be communicably coupled to the SCR outlet temperature sensor 18. The rate at which the NOx data (e.g., SCR inlet and outlet NOx data 112 and 116, etc.) may be measured and stored within each of the modules 106 and 107 may be dependent on the sampling rate of the respective NOx sensors being used in the exhaust aftertreatment system 22. In one embodiment, the data may be acquired at a rate substantially close to the maximum sampling rate of the sensors. In other embodiments, the data may be measured and provided periodically (e.g., every 5 seconds, etc.). The sampling rate may be predefined within the controller 100 or a user may define the sampling rate via the operator I/O device 120.

In certain embodiments, the SCR inlet NOx module 106 and the SCR outlet NOx module 107 are structured to continuously acquire SCR inlet NOx data 112 and SCR outlet NOx data 114. The inlet and outlet NOx data may be provided to the system diagnostic module 108.

Applicant has determined and recognizes that the $NO_2$/NOx ratio affects the rate of reactions within the SCR system, which therefore impacts SCR efficiency. The following equations list some of the most prevalent reactions that occur within the SCR system 52 and their associated $NO_2$/NOx ratio and ANR value. In the equations below, the SCR system 52 uses ammonia ($NH_3$) as the catalyzing agent to reduce NOx:

$$4NO + 4NH_3 + O_2 \rightarrow \quad [1]$$
$$4N_2 + 6H_2O \left(\text{standard reaction}, \frac{NO_2}{NOx} = 0, ANR = 1\right)$$

$$NO + NO_2 + 2NH_3 \rightarrow \quad [2]$$
$$2N_2 + 3H_2O \left(\text{fast reaction}, \frac{NO_2}{NOx} = 0.5, ANR = 1\right)$$

$$6NO_2 + 8NH_3 \rightarrow \quad [3]$$
$$7N_2 + 12H_2O \left(\text{slow reaction}, \frac{NO_2}{NOx} = 1, ANR = 1.33\right)$$

Generally speaking, faster reactions use a relatively lesser amount of SCR catalyst volume to complete, which therefore increases SCR efficiency. In regard to equation [2], this reaction occurs at a fast rate and consumes NO and $NO_2$ in equal amounts. Therefore, a $NO_2$/NOx ratio of 0.5 is an optimum ratio: higher or lower is sub-optimal. According to the present disclosure, the controller 100 is structured to use the effect that the $NO_2$/NOx ratio has on the SCR at relatively low temperatures to aid diagnosis of at least one of the SCR, DOC, and DPF system (i.e., the low temperature range described herein).

In operation of the engine-aftertreatment system, only a small amount of $NO_2$ is emitted from the engine 20. However, NO is oxidized to $NO_2$ in the DOC 30 and, to a lesser extent, in the DPF 40 (i.e., the DPF is catalyzed as described above). At low temperatures, the SCR efficiency may be strongly affected by low NO oxidation. While the Applicant notes that the $NO_2$/NOx ratio is difficult and likely impracticable to be determined in the field without connecting complex and expensive instrumentation to system, Applicant also recognizes that NO oxidation to $NO_2$ (the $NO_2$/NOx ratio at SCR inlet) is a critical parameter for the function of the SCR system. Recognizing the importance of the $NO_2$/NOx ratio and appreciating the impracticability of determining this value in the field, the system diagnostic module 108 is structured to determine the SCR efficiency at a low temperature range where SCR function is most sensitive to $NO_2$/NOx ratio. In other words, the system diagnostic module 108 determines the SCR efficiency at the low temperature range described herein because at this temperature range, SCR efficiency is sensitive to the $NO_2$/NOx ratio, such that the diagnostic determinations are at least partly based on an inferred $NO_2$/NOx ratio, without actually determining the $NO_2$/NOx ratio. Because the $NO_2$/NOx ratio is affected by the oxidation occurring in the DOC, the system diagnostic module 108 is able to correlate low SCR efficiency at the low temperature range with a degraded DOC based on the determined SCR efficiency. As described below and herein, the system diagnostic module 108 uses a two-dimensional diagnostic feature, such that the system diagnostic module 108 also determines the SCR efficiency at an elevated temperature range. Using the two-dimensional diagnostic feature, the system diagnostic module 108 is able to accurately and efficiently diagnose one or more aftertreatment components (i.e., the multiple determinations act as verification determinations to support and confirm each diagnostic determination). Thus, while understanding the $NO_2$/NOx ratio supports the conclusions drawn herein in regard to the systems and methods described, the $NO_2$/NOx ratio is not measured or otherwise explicitly determined during the described systems and methods. Instead, Applicant has determined the temperature range where the SCR efficiency will be strongly affected by low NO oxidation (i.e., the relatively lower SCR inlet temperature range). Thus, according to the present disclosure, the controller 100 is structured to use the effect that the $NO_2$/NOx ratio has on the SCR at relatively low temperature to aid diagnosis of at least one of the SCR, DOC, and DPF system (i.e., the low temperature range described herein).

Figure 4:
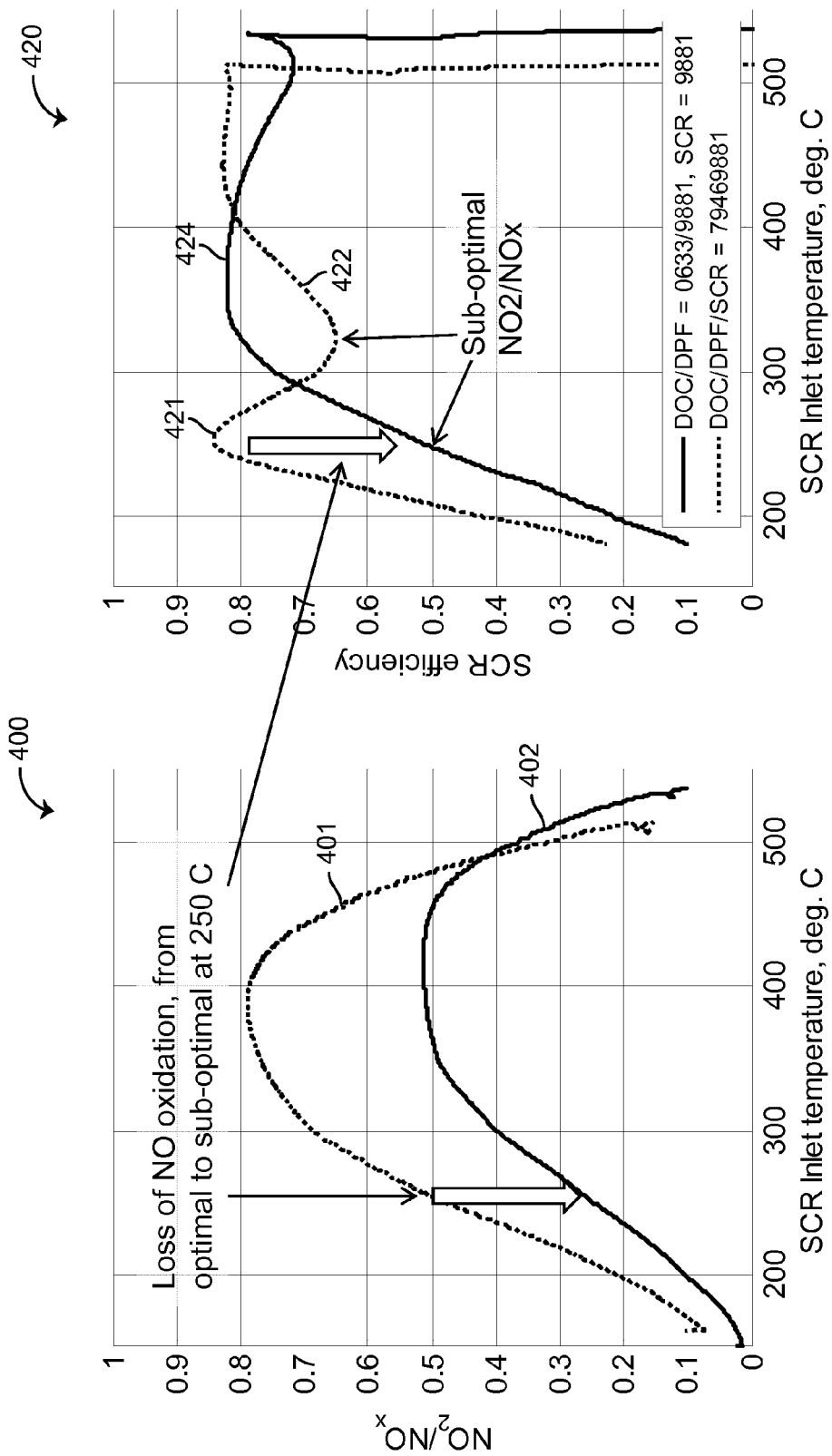
FIG. 4 are graphs depicting an $NO_2/NOx$ ratio and an efficiency of a SCR system as a function of SCR inlet temperature, according to an example embodiment.

Referring now to FIG. 4, a graph 400 of SCR inlet temperature versus $NO_2$/NOx ratio is shown according to one embodiment. As shown, at relatively lower SCR inlet temperatures (e.g., below 250 degrees Celsius), NO oxidation to $NO_2$ is occurring at a low rate. For example, the optimum $NO_2$/NOx ratio (0.5) may still be achieved near 250 degrees Celsius in curve 401 (representing a healthy SCR and DOC/DPF system). Curve 402 represents a degraded DOC and DPF system, but a degraded DOC and DPF system. Relative to curve 401, there is a loss of NO oxidation, from optimal to sub-optimal, near 250 degrees Celsius. In either case, increasing the aftertreatment system temperature affects the $NO_2$/NOx ratio as shown by curves 401 and 402. The corresponding SCR efficiency for the each case is shown in graph 420, where the same healthy SCR unit was tested for both cases. The healthy SCR unit is evidenced by similar SCR efficiency in the range of 400-450 degrees Celsius on both curves 422 and 424. As a result, examination of SCR efficiency with regards to the impact of the $NO_2$/NOx ratio may be inconclusive at elevated temperature ranges. According to the present disclosure, the controller 100 is structured to use SCR efficiencies determined over a range of SCR inlet temperatures to isolate a degraded component to at least one of the SCR, DOC, and the DPF. In some embodiments, the controller 100 is structured to use the determined $NO_2$/NOx ratio at relatively low temperatures (e.g., around 250 degrees Celsius) to aid the diagnosis determination (described more fully herein).

Referring further to FIG. 2, the system diagnostic module 108 is structured to determine that the exhaust aftertreatment system is purged or substantially purged of reductant deposits. According to one embodiment, the system diagnostic module 108 performs a NOx sensor rationality test to determine that the exhaust aftertreatment system is purged of the residual reductant deposits. The NOx sensor rationality test may be based on the SCR inlet and outlet NOx data 112 and 116. Accordingly, the system diagnostic module 108 is structured to receive SCR inlet and outlet NOx data 112 and 116 from modules 106 and 107. By suspending the reductant dosing, the SCR NOx sensors should measure approximately the same levels of NOx in the exhaust flow if each sensor is functioning properly. This is due to no reduction in NOx over the SCR catalyst due to no dosing. However, there still may be trace amounts of reductant (e.g., ammonia) present in the SCR system that cause oxidation of the NOx in the exhaust gas flow such that the measurements from the SCR inlet and outlet sensors may not be exactly equal.

According to one embodiment, the system diagnostic module 108 determines that the residual reductant amount has been purged or substantially purged if the SCR inlet NOx amount is approximately equal to the SCR outlet NOx amount for a predetermined amount of time (i.e., the NOx sensor rationality test). The definition of "approximately" may vary based on the application. However, according to one embodiment, "approximately" may be defined as plus-or-minus five percent of the SCR inlet NOx amount. In FIG. 3, the NOx sensor rationality test corresponds with portion 312 where the preset amount of time is approximately two minutes. In other embodiments, the preset amount of time may differ based on the application. If the SCR inlet NOx amount is not approximately equal to the SCR outlet NOx for the predetermined amount of time, the system diagnostic module 108 may provide a command to continue to suspend reductant dosing and operate the engine for another preset length of time prior to re-running the NOx sensor rationality test. If after the predetermined amount of time the SCR inlet NOx amount is still not approximately equal to the SCR outlet NOx amount, the system diagnostic module 108 may at least one of determine that one or both of the SCR NOx sensors is faulty and/or re-run the test again.

According to various other embodiments, the system diagnostic module 108 may perform any type diagnostic procedure in addition to and/or in place of the NOx sensor rationality test in order to determine that the residual reductant deposits have been substantially purged from the aftertreatment system. In various alternate embodiments, a service technician may replace one or more exhaust aftertreatment system components and/or physically remove the reductant deposits and via I/O device 120 inform the controller 100 that the reductant deposits are removed from the system, such that the diagnostic protocol may continue. All such variations are intended to fall within the spirit and scope of the present disclosure.

After the system diagnostic module 108 determines that the residual reductant deposits in the exhaust aftertreatment system 22 have been purged and the NOx sensors are functioning correctly, the dosing module 104 performs an ammonia-to-NOx (ANR) ratio sweep diagnostic. This corresponds with portion 313 of graph 310. During the sweep, the dosing module 104 adjusts the amount of reductant injected as shown by the changing ANR in portion 332 of graph 330. This sweep is structured to monitor the operability of the doser (e.g., doser 56), and detect any other conditions that prevent achieving the correct reaction stoichiometry in the SCR catalyst 50. The sweep is a pre-condition for successful diagnosis of the catalyst elements, similar to rationality of the NOx sensors or purging stored reductant from the aftertreatment system 22.

After completion of the ANR sweep, the dosing module 104 is structured to suspend dosing again and the engine module 105 is structured to run the engine at a predetermined speed for a preset amount of time again to purge any reductant deposits that may have resulted from the ANR sweep. This portion of the diagnostic protocol corresponds with portion 314 of graph 310 of FIG. 3. The engine set speed and time may vary based on the application just like the initial purging. At this point, the exhaust aftertreatment is at an elevated temperature range and substantially purged from any reductant deposits.

In addition to performing a NOx sensor rationality test to verify operability of the SCR inlet and outlet NOx sensors and confirm that the system has been substantially purged from all reductant deposits, the system diagnostic module 108 is also structured to determine an efficiency of the SCR system. According to one embodiment, the system diagnostic module 108 is structured to determine the efficiency as a function of SCR inlet temperature (e.g., from module 106). The SCR efficiency determination is based on the SCR inlet and outlet NOx data 112 and 116. Based on the determined SCR efficiency as a function of SCR inlet temperature for a range of SCR inlet temperatures, the system diagnostic module 108 is structured to isolate a component failure to at least one of a SCR system, the DOC, and the DPF. This corresponds with portion 315 of graph 310 where the catalysts are evaluated and the range of temperatures is shown in the corresponding portion 322 of graph 320 (FIG. 3). As mentioned above, after the second purging of the system of the reductant deposits, the exhaust aftertreatment system is at an elevated temperature range. To decrease the temperature of the exhaust aftertreatment system to determine SCR efficiency at a relatively lower temperature range, the engine module 105 and dosing module 104 may provide a series of commands that are described below. According to one embodiment, the system diagnostic module 108 isolates component failures in the exhaust aftertreatment system 22 based on the determined SCR efficiency as a function of SCR inlet temperature relative to predefined high and low SCR efficiency thresholds (referring to herein as a "low SCR efficiency threshold" and a "high SCR efficiency threshold"). The high and low SCR efficiency thresholds may be predefined via I/O device 120.

According to one embodiment, the SCR efficiency may be defined as the integrated change in molar flux of NOx between the SCR inlet ($NOx_{inlet}$) and the SCR outlet ($NOx_{outlet}$), divided by the total NOx amount entering the SCR ($NOx_{inlet}$) over a predefined interval (i=0 to time, T). An example determination is represented in equation [1] below.

$$SCR \text{ Efficiency } (\%) = \int_{i=0}^{i=T} \frac{[NOx, \text{ inlet}, i - NOx, \text{ outlet}, i]}{NOx, \text{ inlet}, i} * 100 \quad [1]$$

The determined SCR efficiency provides an indication of the efficacy of the SCR system. For example, a relatively higher efficiency indicates that a substantial amount of the NOx present in the exhaust stream is being reduced to nitrogen and other less pollutant compounds. However, a relatively lower efficiency indicates that the NOx in the exhaust gas stream is substantially not being converted to nitrogen and other less pollutant compounds in the SCR system. According to various alternate embodiments, the SCR efficiency may be determined by any other formula, algorithm, look-up table, and the like.

Figure 5:
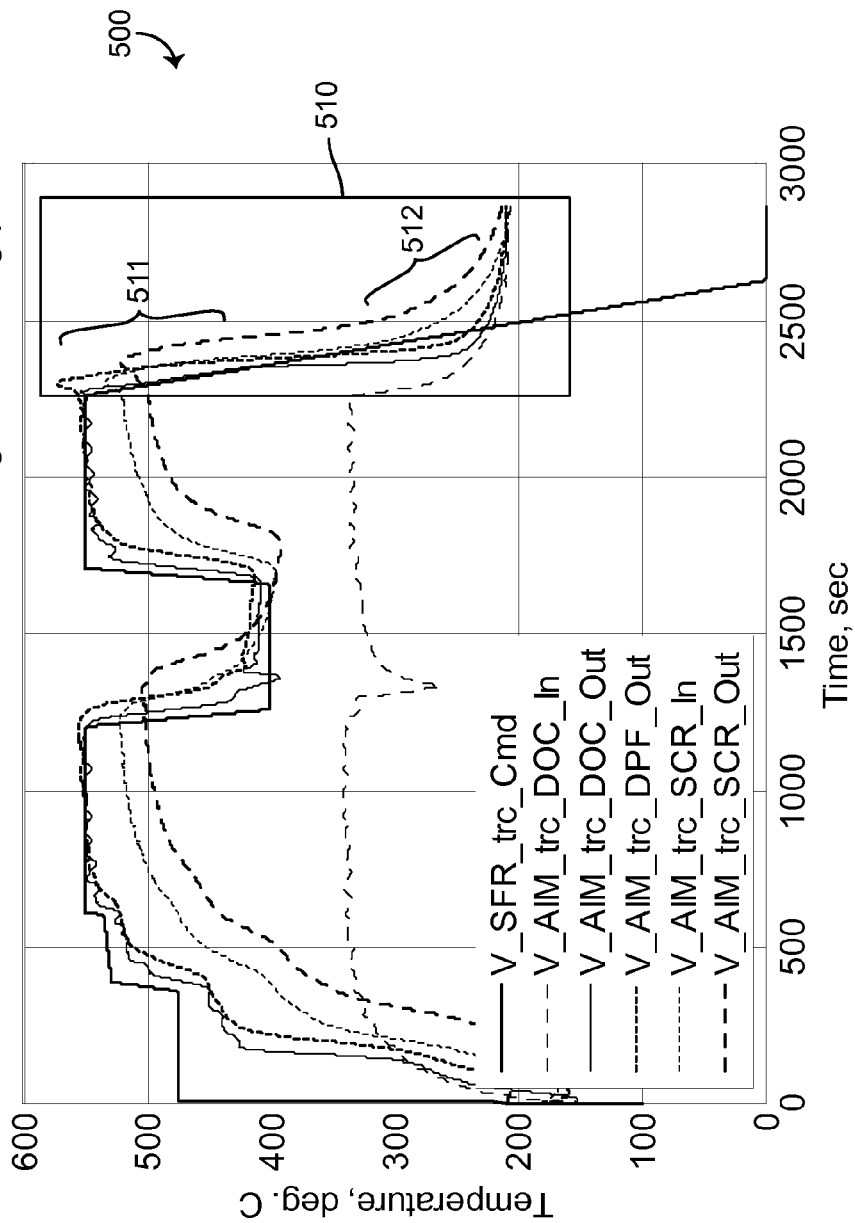
FIG. 5 is a graph SCR inlet temperature during the SCR diagnostic test of FIG. 3, according to an example embodiment.

With the above in mind, first, the system diagnostic module 108 determines an SCR efficiency at an elevated temperature range. As mentioned above, after the ANR sweep and the second purging, the SCR inlet temperature is at an elevated temperature range which is at or near when the first SCR efficiency is determined. According to one embodiment, the elevated temperature range corresponds with SCR inlet temperatures from approximately (i.e., plus-or-minus 25 degrees Celsius) 400 to 550 degrees Celsius. Referring now to FIG. 5 in connection with FIGS. 1-3, a graph 500 of a cooling phase 510 for the exhaust aftertreatment is shown according to one embodiment. The cooling phase portion 510 corresponds with portion 322 of graph 320 in FIG. 3 (e.g., a quenching mode, etc.). Accordingly, the system diagnostic module 108 determines an SCR efficiency corresponding to portion 511 of graph 500 (the "first SCR efficiency," which is at the elevated temperature range). Second, the system diagnostic module 108 determines an SCR efficiency at a relatively cooler SCR inlet temperature range (the "second SCR efficiency corresponding with portion 512 of graph 500). According to one embodiment, the relatively cooler SCR inlet temperature range corresponds with a temperature range of approximately 225 degrees Celsius to 275 degrees Celsius. Based on the determined first and second SCR efficiencies relative to at least one of the high and low SCR thresholds, the system diagnostic module 108 determines whether at least one of the SCR, DOC, and DPF systems are in a degraded state. According to various alternate embodiments, the system diagnostic module 108 may determine the SCR efficiency at a median temperature range (e.g., portion 513) to also aid diagnosis the system. The degraded and/or healthy state determinations are described below in regard to FIG. 6.

As mentioned above, the engine module 105 is structured to cool or quench the system. To quench, the engine module 105 provides an engine operation command to increase exhaust gas flow and reduce exhaust gas temperatures. The controller 100 may provide any engine operation command (e.g., engine speed adjustment, ignition timing adjustment, EGR flow adjustment, etc.) that increases a NOx amount out of the engine and maximizes exhaust gas flow to quench the exhaust gas aftertreatment system (e.g., by flowing relatively cooler exhaust gas over the system components, etc.). The command to increase exhaust gas flow and a NOx amount out of the engine may include, but is not limited to, suspending exhaust gas recirculation (EGR) to the engine and elevating the engine speed while operating the engine under a no or low load condition. This is due to the diagnostic procedure of the present disclosure being structured as an intrusive diagnostic. Accordingly, the procedure is performed in a service center environment, such that the engine speed may be manipulated while the load on the engine stays relatively low. In the example of FIG. 3, the engine speed is increased to approximately 1800 RPM. However, in various other embodiments, the engine speed may be increased to any other speed.

According to one embodiment, the dosing module 104 provides a command to resume dosing at stoichiometric conditions (i.e., a stoichiometric dosing command), such that SCR efficiency determination process may begin. Because the system is at least substantially purged from reductant deposits, dosing at stoichiometric conditions is at least partly intended to ensure that all the reductant is consumed in the SCR reactions, such that no extra reductant accumulates within the system. A result of the suspension of EGR, resuming dosing, and increasing engine speed is relatively lower exhaust gas temperatures that cool or quench the exhaust gas aftertreatment system.

Figure 6:
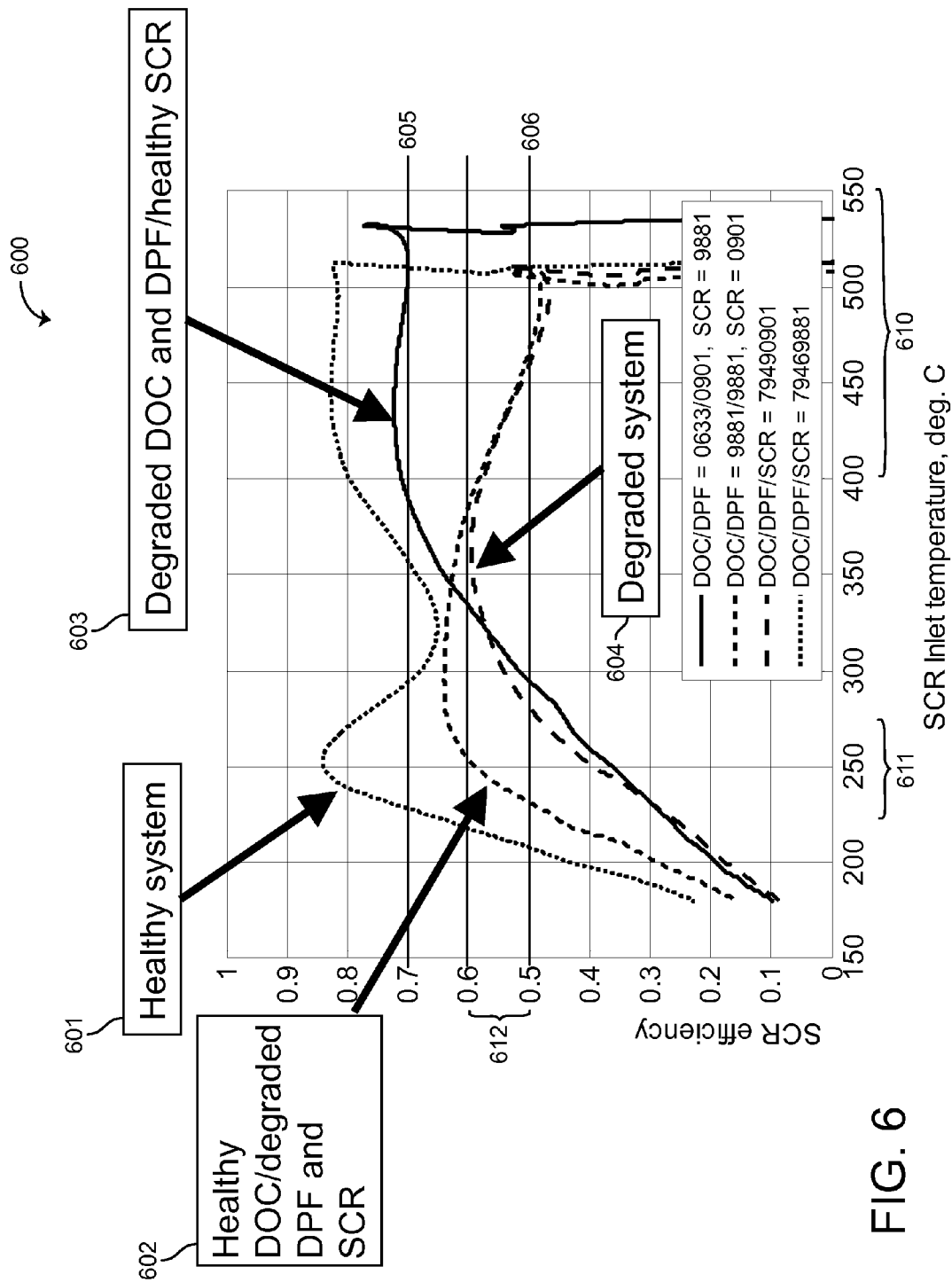
FIG. 6 is a graph of SCR efficiency versus SCR inlet temperature during the SCR diagnostic test of FIG. 3 for various healthy and degraded components in an exhaust aftertreatment system, according to an example embodiment.

As mentioned above, the degraded and/or healthy state determinations may be more fully explained in regard to FIG. 6. Accordingly, referring now to FIG. 6, a graph 600 of curves (e.g., curves 601-604) of SCR efficiency versus SCR inlet temperature for a healthy system 601, a healthy DOC and a degraded DPF and SCR system 602, a degraded DOC and DPF and a healthy SCR 603, and a degraded SCR and DOC/DPF system 604. FIG. 6 also depicts an example high SCR efficiency threshold of 0.7 (605), a low SCR efficiency threshold of 0.5 (606) with a high elevated temperature (portion 610 corresponding to approximately 400 to 550 degrees Celsius) and a relatively low temperature (portion 611 corresponding to approximately 225 to 275 degrees Celsius). While the determinations below are described generically in regard to high/low SCR efficiency thresholds and elevated/low temperature ranges, the previously mentioned values may be substituted in for these generic descriptions according to one example embodiment described herein (i.e., a high SCR efficiency threshold of 0.7, etc.). In various other embodiments, the values for various variables (e.g., elevated temperature range) may be different based on the application (e.g., a high SCR efficiency threshold of 0.8 and a low SCR efficiency threshold of 0.6) than those described and used herein. All such application specific variations are intended to fall within the spirit and scope of the present disclosure.

With reference to graph 600, according to one embodiment, the system diagnostic module 108 only determines that the SCR system is in a degraded state based on the SCR efficiency (i.e., the first SCR efficiency) being below the low SCR efficiency threshold (line 606) at the SCR elevated temperature range (portion 610). At elevated SCR inlet temperatures, the SCR has low sensitivity to the $NO_2$/NOx ratio. The SCR efficiency is relatively insensitive to the $NO_2$/NOx ratio because the kinetics of the SCR reactions (e.g., eqs. [1]-[3], etc.) become faster with increased temperature. As the reactions speed up, efficiency will increase regardless of the $NO_2$/NOx ratio, making the $NO_2$/NOx ratio a relatively less significant factor in SCR efficiency. At high temperatures (e.g., the elevated temperature range), the DOC/DPF catalysts are inhibited such that a high $NO_2$/NOx ratio cannot be created even if the DOC/DPF is healthy. Accordingly, the SCR system has low sensitivity to the $NO_2$/NOx ratio at high temperatures. Therefore, if the SCR efficiency is below the low SCR efficiency threshold at the high elevated temperature range, the system diagnostic module 108 determines that only the SCR is in a degraded state. Because the SCR efficiency is relatively insensitive to the $NO_2$/NOx ratio at higher temperatures, SCR efficiency does not indicate the health of the DOC and DPF at higher temperatures. Accordingly, the system diagnostic module 108 only determines that the SCR is in a degraded state based on the first SCR efficiency being below the low SCR efficiency threshold.

While the aforementioned determination is based on a single data point (i.e., an SCR efficiency at an elevated SCR inlet temperature relative to a low SCR efficiency threshold), the system diagnostic module 108 is structured to make the other determinations described herein in regard to at least two diagnostic data points (e.g., a two-dimensional diagnostic feature). These determinations are explained and shown in regard to curves 601-604. Curve 601 represents a healthy SCR, DOC, and DPF system. The system diagnostic module 108 determines that the SCR, DOC, and DPF systems are in a healthy state based on the first and second SCR efficiencies being approximately at or above the high SCR efficiency threshold. The system diagnostic module 108 is structured to determine that only the DOC is in a healthy state (i.e., at least one of the DPF and SCR are in degraded states) based on the first SCR efficiency being below the high SCR efficiency threshold and the second SCR efficiency being approximately within a marginal SCR efficiency range (portion 612). According to one embodiment, the marginal SCR efficiency range corresponds to SCR efficiency values above the low SCR efficiency threshold. In this example, the marginal SCR efficiency range corresponds to 0.5 to 0.6, where approximately indicates plus-or-minus 0.09. This condition corresponds to curve 602. The system diagnostic module 108 is structured to determine that both the DOC and the DPF are in a degraded state based on first efficiency being approximately at or above the high SCR efficiency threshold and the second SCR efficiency being approximately at or above the low SCR efficiency threshold. This condition corresponds with curve 603. The system diagnostic module 108 is structured to determine that the SCR, DOC, and DPF are all in a degraded state based on the first SCR efficiency being below the high SCR efficiency threshold and the second SCR efficiency being at or below the low SCR efficiency threshold. This condition corresponds with curve 604.

As mentioned above, at the elevated temperature range, the SCR has low sensitivity to the $NO_2$/NOx ratio. Accordingly, even if the DOC/DPF are in a healthy state, their oxidation function has little to no impact on the determined SCR efficiency. As shown in FIG. 6, curves 601 and 603 indicate healthy SCR systems while curves 602 and 604 indicate SCR systems in a degraded state. Accordingly, SCR efficiency at elevated temperature provides the diagnostic module 108 with an effective diagnostic feature for the SCR system. However, at low temperatures, the SCR has a greater sensitivity to the NO$_2$/NOx ratio. Accordingly, to isolate failures, the diagnostic module 108 utilizes a two-dimensional diagnostic feature (SCR efficiency at high and low SCR inlet temperatures) in order to substantially capture the nuances of curves 601-604. To achieve a high SCR efficiency at relatively low SCR inlet temperatures, substantial reductant coverage is needed in the SCR system (not present here due to the purging) or the NO$_2$/NOx ratio must be near the optimum value of 0.5. This is more clearly shown in graph 420 of FIG. 4, where at low temperatures, sub-optimal NO$_2$/NOx ratios result in relatively lower SCR efficiencies. The optimal NO$_2$/NOx ratio is indicated at point 421 on curve 422, which corresponds with curve 401 (curve 424 corresponds with curve 402). To isolate between whether the DOC, DPF, or both are the cause of the low SCR efficiency, the system diagnostic module 108 examines the SCR efficiency at the low temperature (i.e., the second SCR efficiency). As shown in curve 602, a healthy DOC corresponds with a second SCR efficiency at or above the low SCR efficiency. It is important to note that isolating low SCR efficiency at low temperature to either a degraded DOC or DPF individually may not be possible and it may be necessary to replace both components simultaneously to repair the system or replace a single component and repeat the test.

Referring back to FIG. 2, based on the state determined by the system diagnostic module 108, the notification module 109 is structured to provide one or more notifications. The notifications may provide an indication of whether the SCR system, DOC system, and/or DPF system needs to be serviced (i.e., checked, replaced, additional troubleshooting needed, etc.). The notifications may be provided to an I/O device 120 and/or to any device of the service technician who performed the diagnostic procedure.

Figure 7:
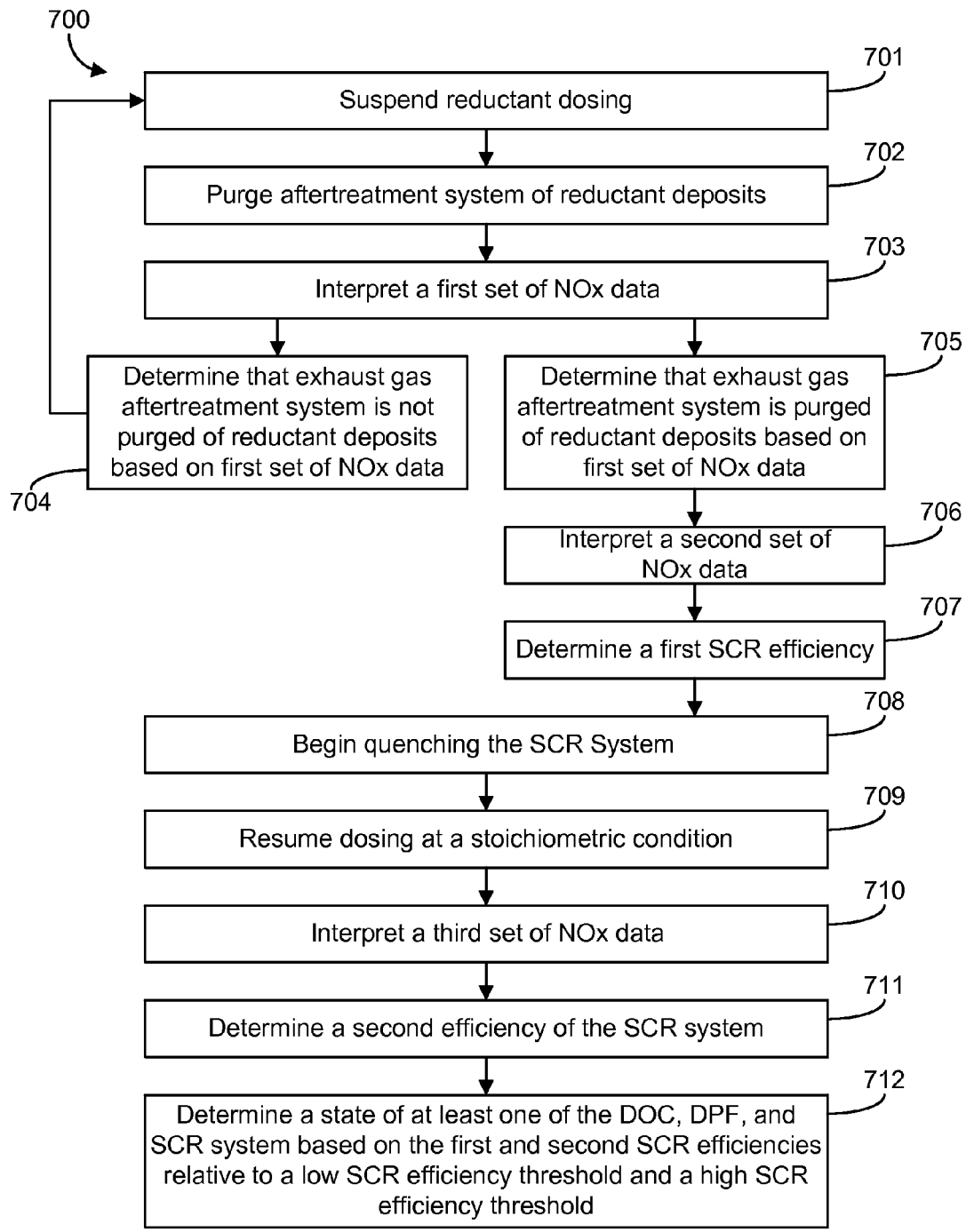
FIG. 7 is a flow diagram of a method of isolating degraded components in an exhaust aftertreatment system, according to an example embodiment.

Referring now to FIG. 7, a flowchart of a method 700 of diagnosing at least one of a SCR, DOC, and DPF system in an exhaust aftertreatment system is shown according to an example embodiment. In one example embodiment, method 700 may be implemented with the controller 100 of FIG. 1. Accordingly, method 700 may be described in regard to FIGS. 1-6.

At process 701, reductant dosing is suspended in the exhaust aftertreatment system. According to one embodiment, the controller 100 provides a command to a reductant doser to stop reductant injections into the exhaust gas stream. At process 702, the exhaust aftertreatment system is purged of reductant deposits. According to one embodiment, the reductant deposits are purged by increasing the exhaust gas temperatures to increase the temperature of the components in the exhaust gas aftertreatment to burn off the reductant deposits. The controller 100 may provide a command to increase engine speed while the dosing is suspended in order to increase exhaust gas temperatures. In other embodiments, the controller 100 may provide any other command structured to increase exhaust gas temperatures.

At process 703, a first set of NOx data is interpreted (e.g., received from SCR inlet and outlet NOx sensors). The first set of NOx data includes SCR inlet NOx data (e.g., SCR inlet NOx data 112, etc.) and SCR outlet NOx data (e.g., SCR outlet NOx data 116, etc.). From the first set of NOx data, the rationality of the NOx sensors (e.g., functionality, operability, etc.) may be determined. If the NOx sensors are determined to be faulty, each may be replaced and the testing re-run (e.g., return to process 701, etc.). Conversely, if the NOx sensors are operational, the testing continues to process 704. At process 704, the controller 100 determines that the exhaust gas aftertreatment system is not purged of reductant deposits based on the first set of NOx data. According to one embodiment, the controller 100 determines that the exhaust aftertreatment system is not purged by performing a SCR NOx sensor rationality test, as described above. While dosing is suspended, the SCR inlet NOx sensor should measure approximately the same amount of NOx as the SCR outlet NOx sensor for a predetermined amount of time. As mentioned above, even though dosing is suspended, the NOx amounts may not be exactly equal due to trace reductant amounts present in the system that were not purged. If the SCR inlet NOx amount is not approximately equal to an SCR outlet NOx amount, the controller 100 determines reductant deposits are still in the system. Determination of whether SCR inlet NOx amount is approximately equal (or not equal) to the SCR outlet NOx amount may vary based on the application and/or any preset via, e.g., the I/O device 120. For example, one embodiment may designate measurements within five percent to indicate that the system has been purged. Another embodiment may designate measurements within fifteen percent to indicate that the system has been purged. In any event, if the controller 100 determines that the system is not purged based on, in this case, the NOx sensor rationality test, processes 701-703 may re-run. These processes may be re-run until the system is purged and/or a determination is made that an issue exists with the NOx.

In comparison, at process 705, a determination is made that the exhaust aftertreatment system is purged of the reductant deposits based on the first set of NOx data. At which point, the evaluation of the DOC, DPF, and SCR may then occur. At process 706, a second set of NOx data is interpreted, the second set of NOx data corresponding to SCR inlet NOx data 112 and SCR outlet NOx data 116. Because the second set of NOx data is received following the purging of the exhaust aftertreatment system, the second set of NOx data corresponds to an elevated temperature range (in regard to an SCR inlet temperature). The second set of NOx data is used to establish the health of the dosing system and whether there are issues in dosing at the desired ANR. If issues are discovered, the condition is corrected and processes 701-706 may re-run. Based on the second set of NOx data, a first SCR efficiency is determined (707) that corresponds to an elevated SCR inlet temperature range. According to one embodiment, the elevated temperature range corresponds with portion 610 of graph 600 (i.e., approximately 400 to 550 degrees Celsius).

At process 708, the engine out exhaust gas temperatures are decreased in order to quench the SCR system. By cooling the exhaust gas temperatures, the SCR inlet temperature also decreases. This is indicated in portion 510 of graph 500 of FIG. 5. Quenching the SCR system, may be performed by reducing the temperature of the exhaust gas flowing through the exhaust gas aftertreatment system via one or more engine operation commands provided by the controller 100. As mentioned above, the engine operation commands may include, but are not limited to, increasing engine speed while operating the engine at a no to low load operating condition. According to one embodiment, dosing is resumed at stoichiometric conditions (in some embodiments, approximately at stoichiometric conditions (e.g., off of stoichiometric conditions by less than five percent) (process 709). As mentioned above, this is to ensure or substantially ensure that all the reductant injected is used to decrease the NOx amounts in the exhaust gas stream.

At process 710, a third set of NOx data is interpreted. At process 711, the controller 100 determines a second SCR efficiency based on the third set of NOx data, which corresponds to a relatively lower range of SCR inlet temperature (i.e., portion 611 of graph 600). The third set of NOx data thereby facilitates the determination of the SCR efficiency over two temperature ranges, as indicated by portions 610 and 611 of graph 600.

At process 712, a state is determined for at least one of a diesel oxidation catalyst (DOC), a diesel particulate filter (DPF), and a SCR system based on the first and second SCR efficiencies relative to a low SCR efficiency threshold and a high SCR efficiency threshold. The state designation may include healthy or degraded. In various other embodiments, the state designation may also include a state in-between healthy and degraded, such as further inspection needed. The determined state may be provided to a technician performing method 700.

According to one embodiment, the high SCR efficiency threshold is approximately 0.7 and the low SCR efficiency is approximately 0.5. In one embodiment, approximately refers to plus-or-minus 0.09. In this case, the state determinations may follow the state determinations described above. For example, the controller 100 only determines that the SCR system is in a degraded state based on the first SCR efficiency being below the low SCR efficiency threshold; that the SCR, DOC, and DPF systems are in a healthy state based on the first and second SCR efficiencies being approximately at or above the high SCR efficiency threshold; that only the DOC is in a healthy state based on the first SCR efficiency being below the high SCR efficiency threshold and the second SCR efficiency being within a marginal SCR efficiency range (e.g., 0.5-0.6); that both the DOC and the DPF are in a degraded state based on first efficiency being approximately at or above the high SCR efficiency threshold and the second SCR efficiency being approximately at or above the low SCR efficiency threshold; and that the SCR, DOC, and DPF are all in a degraded state based on the first SCR efficiency being below the high SCR efficiency threshold and the second SCR efficiency being at or below the low SCR efficiency threshold.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
an engine;
an exhaust aftertreatment system in exhaust gas receiving communication with the engine, wherein the exhaust aftertreatment system includes a selective catalytic reduction (SCR) system, a diesel oxidation catalyst (DOC), and a catalyzed diesel particulate filter (DPF); and
a controller communicably coupled to the engine and the exhaust aftertreatment system, the controller structured to:
interpret a first set of NOx data, the first set of NOx data including selective catalytic reduction (SCR) inlet NOx data and SCR outlet NOx data;
determine that the exhaust aftertreatment system is purged of a reductant deposit based on the first set of NOx data;
interpret a second set of NOx data corresponding to an elevated SCR inlet temperature range, the second set of NOx data including SCR inlet NOx data and SCR outlet NOx data;
determine a first SCR efficiency based on the second set of NOx data;
reduce a temperature of the exhaust gas flowing through the exhaust aftertreatment system;
interpret a third set of NOx data corresponding to a relatively lower SCR inlet temperature range, the third set of NOx data including SCR inlet NOx data and SCR outlet NOx data;
determine a second SCR efficiency based on the third set of NOx data; and
determine a state of at least one of the DOC, DPF, and SCR system based on the first and second SCR efficiencies relative to a low SCR efficiency threshold and a high SCR efficiency threshold.

2. The system of claim 1, wherein the controller is structured to determine that the SCR system is in a degraded state based on the first SCR efficiency being at or below the low SCR efficiency threshold.

3. The system of claim 1, wherein the controller is structured to determine that the SCR, DOC, and DPF are all in a healthy state based on the first and second SCR efficiencies being at or above the high SCR efficiency threshold.

4. The system of claim 1, wherein the controller is structured to determine that only the DOC and DPF are in a degraded state based on the first SCR efficiency being at or above the high SCR efficiency threshold and the second SCR efficiency being at or below the low SCR efficiency threshold.

5. The system of claim 1, wherein the controller is structured to determine that the DOC, DPF, and SCR are all in a degraded state based on the first SCR efficiency being below the high SCR efficiency threshold and the second SCR efficiency being at or below the low SCR efficiency threshold.

6. The system of claim 1, wherein the elevated SCR inlet temperature range includes a range of SCR inlet temperatures from approximately 400 degrees Celsius to 550 degrees Celsius, wherein the relatively lower SCR inlet temperature range includes a range of SCR inlet temperatures from approximately 225 degrees Celsius to 275 degrees Celsius, wherein the low SCR efficiency threshold is approximately equal to 0.5, and wherein the high SCR efficiency threshold is approximately equal to 0.7.

7. A method, comprising:
purging an exhaust aftertreatment system of a reductant deposit;
interpreting a first set of NOx data, the first set of NOx data including selective catalytic reduction (SCR) inlet NOx data and SCR outlet NOx data;
determining that the exhaust aftertreatment system is purged of the reductant deposit based on the first set of NOx data;
interpreting a second set of NOx data corresponding to an elevated SCR inlet temperature range, the second set of NOx data including SCR inlet NOx data and SCR outlet NOx data;
determining a first SCR efficiency based on the second set of NOx data;
reducing a temperature of the exhaust gas flowing through the exhaust aftertreatment system;

interpreting a third set of NOx data corresponding to a relatively lower SCR inlet temperature range, the third set of NOx data including SCR inlet NOx data and SCR outlet NOx data;

determining a second SCR efficiency based on the third set of NOx data; and determining a state of at least one of a diesel oxidation catalyst (DOC), a diesel particulate filter (DPF), and a SCR system based on the first and second SCR efficiencies relative to a low SCR efficiency threshold and a high SCR efficiency threshold.

8. The method of claim 7, further comprising determining that the SCR system is in a degraded state based on the first SCR efficiency being at or below the low SCR efficiency threshold.

9. The method of claim 7, further comprising determining that only the DOC and DPF are in a degraded state based on the first SCR efficiency being at or above the high SCR efficiency threshold and the second SCR efficiency being at or below the low SCR efficiency threshold.

10. The method of claim 7, further comprising determining that the SCR, DOC, and DPF are all in a healthy state based on the first and second SCR efficiencies being at or above the high SCR efficiency threshold.

11. The method of claim 7, further comprising determining that only the DOC is in a healthy state based on the first SCR efficiency being below the high SCR efficiency threshold and the second SCR efficiency being within a marginal SCR efficiency range, wherein the marginal efficiency range is above the low SCR efficiency threshold.

12. The method of claim 7, further comprising determining that the DOC, DPF, and SCR are all in a degraded state based on the first SCR efficiency being below the high SCR efficiency threshold and the second SCR efficiency being at or below the low SCR efficiency threshold.

13. The method of claim 7, wherein the elevated SCR inlet temperature range includes a range of SCR inlet temperatures from approximately 400 degrees Celsius to 550 degrees Celsius, wherein the low SCR inlet temperature range includes a range of SCR inlet temperatures from approximately 225 degrees Celsius to 275 degrees Celsius, wherein the low SCR efficiency threshold is approximately equal to 0.5, and wherein the high SCR efficiency threshold is approximately equal to 0.7.

14. The method of claim 7, wherein the DPF is catalyzed.

15. An apparatus, comprising
an exhaust aftertreatment system including, a diesel oxidation catalyst (DOC), a diesel particulate filter (DPF), and an SCR system;
a controller communicably coupled to the exhaust aftertreatment system and including
a dosing module configured to suspend dosing in the exhaust aftertreatment system,
a selective catalytic reduction (SCR) inlet NOx module configured to interpret SCR inlet NOx data from the SCR inlet NOx sensor and interpret an SCR inlet temperature,
a SCR outlet NOx module configured to interpret SCR outlet NOx data from the SCR outlet NOx sensor, and
a system diagnostic module configured to determine an efficiency of the SCR system based on the SCR inlet and outlet NOx data over a range of SCR inlet temperatures, and reduce a temperature of an exhaust gas flowing through the exhaust aftertreatment system, wherein the system diagnostic module is further configured to determine a state of at least one of the diesel oxidation catalyst (DOC), the diesel particulate filter (DPF), and the SCR system based on the SCR efficiency at an elevated SCR inlet temperature range and the SCR efficiency at a relatively lower SCR inlet temperature range relative to a high SCR efficiency threshold and a low SCR efficiency threshold.

16. The apparatus of claim 15, wherein the elevated SCR inlet temperature range includes a range of SCR inlet temperatures from approximately 400 degrees Celsius to 550 degrees Celsius, wherein the low SCR inlet temperature range includes a range of SCR inlet temperatures from approximately 225 degrees Celsius to 275 degrees Celsius, wherein the low SCR efficiency threshold is approximately equal to 0.5, and wherein the high SCR efficiency threshold is approximately equal to 0.7.

17. The apparatus of claim 16, wherein the system diagnostic module is configured to determine that the SCR system is in a degraded state based on the first SCR efficiency being at or below the low SCR efficiency threshold.

18. The apparatus of claim 16, wherein the system diagnostic module is configured to determine that the SCR, DOC, and DPF are all in a healthy state based on the first and second SCR efficiencies being at or above the high SCR efficiency threshold.

19. The apparatus of claim 16, wherein the system diagnostic module is configured to determine that only the DOC and DPF are in a degraded state based on the first SCR efficiency being at or above the high SCR efficiency threshold and the second SCR efficiency being at or below the low SCR efficiency threshold.

20. The apparatus of claim 16, wherein the system diagnostic module is configured to determine that the DOC, DPF, and SCR are all in a degraded state based on the first SCR efficiency being below the high SCR efficiency threshold and the second SCR efficiency being at or below the low SCR efficiency threshold.

* * * * *